UNITED STATES PATENT OFFICE.

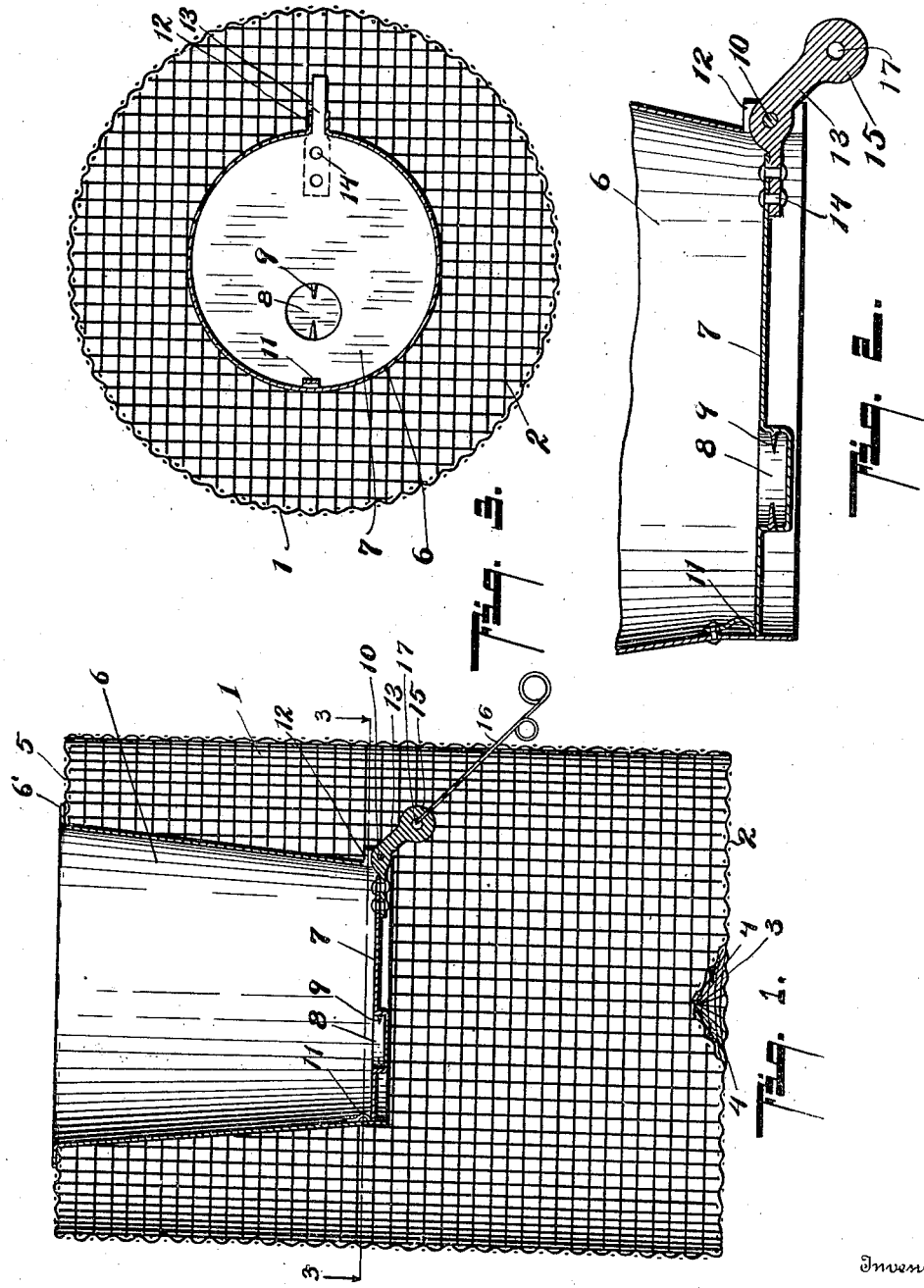

HARRY P. DAMSMA, OF BATTLE CREEK, MICHIGAN.

ANIMAL-TRAP.

995,664.    Specification of Letters Patent.    Patented June 20, 1911.

Application filed January 8, 1910. Serial No. 536,994.

*To all whom it may concern:*

Be it known that I, HARRY P. DAMSMA, a citizen of the United States, residing at the city of Battle Creek, county of Calhoun, and State of Michigan, have invented certain new and useful Improvements in Animal-Traps, of which the following is a specification.

This invention relates to improvements in animal traps.

My improved animal trap is especially designed by me and the structure illustrated is particularly adapted for use as a rat trap, although the same is desirable for catching other small animals.

The main objects of this invention are: to provide an improved animal trap which is simple and economical in structure and at the same time very effective.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claim.

A structure constituting an effective and preferred embodiment of the features of my invention is clearly illustrated in the accompanying drawing, forming a part of this specification, in which:

Figure 1 is a vertical central section of a structure embodying the features of my invention, the door retainer being shown engaged. Fig. 2 is an enlarged detail vertical section corresponding to that of Fig. 1 of the lower end of the entrance passage. Fig. 3 is a horizontal section taken on a line corresponding to the line 3—3 of Fig. 1.

In the drawings, similar reference numerals refer to similar parts throughout the several views.

Referring to the drawing, the cage 1 is preferably formed of wire screen, including the bottom and the top. The bottom 2 is preferably provided with a central raised portion 3 forming a bait receptacle, the receptacle being preferably provided with retainers 4. The top 5 of the receptacle is provided with a central hole in which the entrance passage 6 is arranged. The passage 6 is preferably provided with an out-turned flange 6' at its upper end whereby it is supported. This entrance passage is formed of sheet metal and is preferably somewhat tapered. It is supported in a spaced relation to the side walls of the cage, so that an animal in attempting to escape from the cage will run up on the outside of the passage. At the lower end of the passage is a trap door 7 having a bait holder or receptacle 8 on its upper side. This holder is preferably well-like in form and provided with spur-like retainers 9. The door is preferably arranged to close into the lower end of the passage, it being mounted on the pintle 10 and provided with a stop 11, so that it is impossible for the animal to open the door in its attempt to escape from the cage. The hinge for the door preferably consists of a pair of ears 12 formed integrally with the passage and the hinge member 13 to which the door is secured by the rivets 14. On this hinge member is a counter-balanced weight 15 for the door so that it is automatically closed.

When the trap is set, bait is placed in the receptacle 3 in the bottom and in the bait holder 8 on the entrance door. The bait in the bottom is visible to the animal from the outside of the trap. In attempting to reach this bait the animal is quite likely to climb to the top of the cage when it sees the bait in the holder 8 and in attempting to secure this bait falls through the trap door into the cage. The animal in the cage is quite likely to attempt to get the bait in the receptacle 4 and this serves to attract other animals to the trap.

The structure is very simple and economical to produce.

When it is desired to remove the animals from the trap, they may be drowned in the trap if desired, and the entrance passage removed to provide a discharge opening.

In carrying the trap with an animal therein, and before immersing the same in water, I preferably engage the hook 16 in the opening 17 provided therefor in the counterweight 15, so that the door cannot open, no matter in what position the trap may be placed. This hook 16 is arranged through the screen of the body, to be manipulated from the outside. This is shown in Fig. 1 of the drawing engaged.

Having thus described my invention what

I claim as new and desire to secure by Letters Patent is:

In an animal trap, the combination with a cage, of an entrance depending from the top of said cage; a counterbalanced trap door for the lower end of said passage adapted to close into said passage, said door being formed of sheet metal and having a well-like bait holder formed therein, the side walls of said bait holder being provided with inwardly-projecting bait engaging pins.

In witness whereof, I have hereunto set my hand and seal in the presence of two witnesses.

HARRY P. DAMSMA. [L. S.]

Witnesses:
L. G. GREENFIELD,
F. GERTRUDE TALLMAN.

Copies of this patent may be obtained for five cents each, by addressing the "Commissioner of Patents, Washington, D. C."